(12) United States Patent
Fang et al.

(10) Patent No.: US 10,333,666 B2
(45) Date of Patent: Jun. 25, 2019

(54) METHOD AND DEVICE FOR TRANSMITTING DATA

(71) Applicant: ZTE Corporation, Shenzhen, Guangdong (CN)

(72) Inventors: Huiying Fang, Shenzhen (CN); Bo Dai, Shenzhen (CN); Xianming Chen, Shenzhen (CN); Shuqiang Xia, Shenzhen (CN); Jing Shi, Shenzhen (CN)

(73) Assignee: ZTE CORPORATION, Shenzhen, Guangdon (CN)

(*) Notice: Subject to any disclaimer, the term of this patent is extended or adjusted under 35 U.S.C. 154(b) by 10 days.

(21) Appl. No.: 15/126,145

(22) PCT Filed: Jul. 22, 2014

(86) PCT No.: PCT/CN2014/082743
§ 371 (c)(1),
(2) Date: Sep. 14, 2016

(87) PCT Pub. No.: WO2015/139396
PCT Pub. Date: Sep. 24, 2015

(65) Prior Publication Data
US 2018/0034605 A1 Feb. 1, 2018

(30) Foreign Application Priority Data

Mar. 17, 2014 (CN) .......................... 2014 1 0098112

(51) Int. Cl.
*H04L 5/04* (2006.01)
*H04L 5/00* (2006.01)
*H04W 72/04* (2009.01)

(52) U.S. Cl.
CPC ............ *H04L 5/0044* (2013.01); *H04L 5/001* (2013.01); *H04L 5/0064* (2013.01);
(Continued)

(58) Field of Classification Search
CPC ..... H04L 5/001; H04L 5/0044; H04L 5/0053; H04L 5/0064; H04L 5/0092; H04W 72/04; H04W 72/0406
See application file for complete search history.

(56) References Cited

U.S. PATENT DOCUMENTS

2009/0303944 A1* 12/2009 Fukuoka ............... H04L 5/0037
370/329
2011/0199945 A1   8/2011 Chang
(Continued)

FOREIGN PATENT DOCUMENTS

CN   101499963 A   8/2009
CN   102300267 A   12/2011
(Continued)

OTHER PUBLICATIONS

Supplementary European Search Report in European application No. 14885865.7, dated Mar. 16, 2017, 35 pgs.
(Continued)

*Primary Examiner* — Steven H Nguyen
(74) *Attorney, Agent, or Firm* — Cooper Legal Group, LLC

(57) ABSTRACT

Disclosed is a method for transmitting data. The method comprises: dividing an available system bandwidth into a plurality of pre-defined candidate positions, and determining a frequency domain position of data transmission based on the pre-defined candidate positions; and transmitting data in the determined frequency domain position. Also disclosed is a device for transmitting data, comprising: a dividing module configured to divide an available system bandwidth into a plurality of pre-defined candidate positions; a determination module configured to determine a frequency domain position of data transmission based on the pre-defined candidate positions; and a transmission module configured (Continued)

to transmit data in the determined frequency domain position.

18 Claims, 4 Drawing Sheets

(52) U.S. Cl.
CPC ........... *H04L 5/0092* (2013.01); *H04W 72/04* (2013.01); *H04L 5/0053* (2013.01); *H04W 72/0406* (2013.01)

(56) References Cited

U.S. PATENT DOCUMENTS

| | | | |
|---|---|---|---|
| 2013/0077584 A1 | 3/2013 | Lee et al. | |
| 2013/0100900 A1 | 4/2013 | Lee et al. | |
| 2014/0133433 A1 | 5/2014 | Ahn | |
| 2015/0085785 A1* | 3/2015 | Kim | H04L 5/0092 370/329 |
| 2015/0124732 A1* | 5/2015 | Seo | H04B 7/0413 370/329 |

FOREIGN PATENT DOCUMENTS

| | | |
|---|---|---|
| CN | 103237351 A | 8/2013 |
| KR | 20140010158 A | 1/2014 |

OTHER PUBLICATIONS

"Search space design for enhanced PDCCH", Jan. 31, 2012, 3GPP Draft; R1-120236, 3rd Generation Partnership Project (3GPP), Mobile Competence Centre ; 650, Route Des Lucioles ; F-06921 Sophia-Antipolis Cedex ; France, vol. RAN WG1, No. Dresden, Germany; Feb. 6, 2012, 4 pgs.

International Search Report in international application No. PCT/CN2014/082743, dated Sep. 1, 2014, 5 pgs.

English Translation of the Written Opinion of the International Search Authority in international application No. PCT/CN2014/082743, dated Sep. 1, 2014, 8 pgs.

* cited by examiner

METHOD AND DEVICE FOR TRANSMITTING DATA

TECHNICAL FIELD

The disclosure relates to the field of wireless communications, and in particular to a data transmission method and apparatus.

BACKGROUND

An MTC User Equipment (MTC UE) is also called as a Machine-to-Machine (M2M) user communication device, which is a main application form of the internet of things at the present stage. Low power consumption and low cost are important guarantees for large-scale application. A smart metering device is one of most typical applications of an MTC device. M2M devices deployed on the market currently are mainly based on a Global System of Mobile communication (GSM) system.

Recently, the spectral efficiency of Long Term Evolution (LTE) is high, so more and more mobile operators determine LTE as an evolution direction of a future broadband wireless communication system. LTE-based M2M multi-type data services will be more attractive. However, only when the cost of an LTE-M2M device is lower than that of an MTC terminal of a GSM system, M2M services can be truly transferred from GSM to LTE systems.

The cost of the MTC UE mainly includes cost from baseband processing and radio frequency, and reducing a reception bandwidth of a downlink data channel of the UE is a very effective way to reduce the cost of the MTC UE. By means of further analysis, reducing a radio frequency bandwidth slightly affects the cost, and therefore the cost can be effectively reduced by reducing a baseband processing bandwidth of the UE. A downlink reception bandwidth of the MTC UE can be set as a small bandwidth, such as 1.4 MHZ or 3 MHz, supported by the LTE system. That is, a maximum support downlink system bandwidth of the MTC UE is usually smaller than a maximum reception bandwidth 20 MHz required by a conventional LTE terminal (Ordinary Legacy R8/9/10 UE, OLUE) under a single carrier. In a current LTE system, a Physical Downlink Shared Channel (PDSCH) is configured to transmit a system common message, a paging message and a downlink data service, and a specific frequency domain position of the PDSCH in a subframe is indicated by a Physical Downlink Control Channel (PDCCH). Before decoding a data service, a traditional LTE terminal needs to cache PDSCH data within the whole system bandwidth. Data caching for the whole system bandwidth is contrary to reduction of the cost of the MTC UE.

When the low-cost reception bandwidth-limited MTC UE accesses to the LTE system, the first problem to be solved is how to determine a frequency domain position of a small bandwidth. An existing solution mainly uses an additional system message to indicate a frequency domain position where data of the low-cost reception bandwidth-limited MTC UE is sent, and frequency domain sending positions of system common information and UE specific information are not correspondingly distinguished. Based on the existing solution, data may be transmitted wrongly, and the utilization rate of resources is low.

SUMMARY

In view of this, in order to solve the existing technical problems, the embodiments of the disclosure provide:

a data transmission method, dividing an available system bandwidth into a plurality of pre-defined candidate positions, which may include that:

a frequency domain position for data transmission is determined based on the pre-defined candidate positions; and data is transmitted at the determined frequency domain position.

A data transmission apparatus including: a division module, a determination module and a transmission module, in which:

the division module is configured to divide an available system bandwidth into a plurality of pre-defined candidate positions;

the determination module is configured to determine a frequency domain position for data transmission based on the pre-defined candidate positions; and the transmission module is configured to transmit data at the determined frequency domain position.

According to a data transmission method and apparatus provided by the embodiments of the disclosure, an available system bandwidth is divided into a plurality of pre-defined candidate positions, and a frequency domain position for data transmission is determined based on the pre-defined candidate positions; and data is transmitted at the determined frequency domain position. By adopting the solutions provided in the embodiments of the disclosure, the problems that a low-coverage terminal user may wrongly receive data and the utilization rate of resources is low can be solved, and normal communication demands of a terminal device are guaranteed.

DETAILED DESCRIPTION

In order to make the technical solutions of the disclosure clearer, the disclosure will be further elaborated below in conjunction with the drawings and the specific embodiments in detail. It is important to note that the embodiments of the disclosure and various modes in the embodiments can be combined under the condition of no conflicts.

Figure 1:
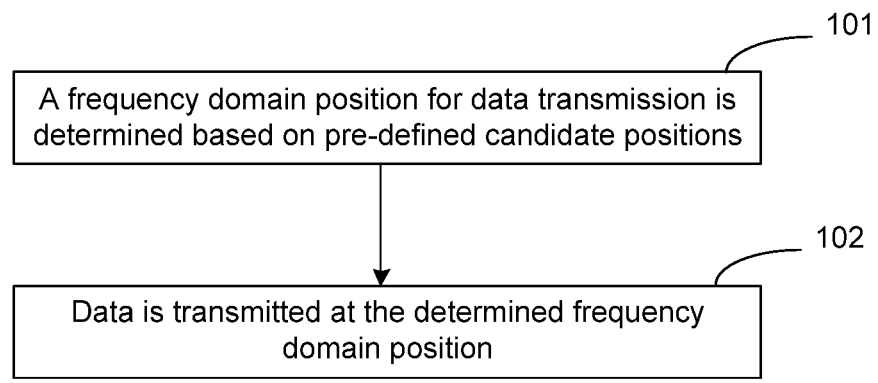
FIG. 1 is a flowchart of a data transmission method according to an embodiment of the disclosure.

The embodiments of the disclosure provide a data transmission method, dividing an available system bandwidth into a plurality of pre-defined candidate positions. As shown in FIG. 1, the method includes the steps as follows.

Step 101: A frequency domain position for data transmission is determined based on the pre-defined candidate positions.

Step 102: Data is transmitted at the determined frequency domain position.

Optionally, the step that the available system bandwidth is divided into the plurality of pre-defined candidate positions includes that: the available system bandwidth is divided into the plurality of pre-defined candidate positions (also called as pre-defined candidate areas) in accordance with a reception bandwidth of a terminal.

Optionally, the step that the available system bandwidth is divided into the plurality of pre-defined candidate positions includes that:

the available system bandwidth is divided into the plurality of pre-defined candidate positions in accordance with an equal division mode, a frequency domain bandwidth of each pre-defined candidate position being equal to a maximum reception bandwidth of the terminal; or the available system bandwidth is divided into the plurality of pre-defined candidate positions in accordance with a fixed division position, a frequency domain bandwidth of each pre-defined candidate position being smaller than or equal to a maximum reception bandwidth of the terminal.

It is important to note that the equal division mode only requires each candidate area bandwidth to be equal to a maximum UE reception bandwidth, but not refers to equal division of the whole system bandwidth. For instance, if the reception bandwidth of the terminal is 3 MHz, a system bandwidth of 20 MHz is divided into six positions by taking every 15 Distributed Virtual Resource Blocks (DVRB) as one pre-defined candidate position.

It is important to note that when the available system bandwidth is divided into the plurality of pre-defined candidate positions in accordance with the fixed division position, candidate area bandwidths are smaller than or equal to a maximum UE reception bandwidth, different candidate areas may be equal in size or may be not equal in size. For instance, 20 MHz and 15 MHz are divided into six areas, 10 MHz is divided into three areas, and 5 MHz is divided into two areas, each area corresponding to a pre-defined candidate position.

Optionally, the step that the available system bandwidth is divided into the plurality of pre-defined candidate positions includes that:

for different types of data, the available system bandwidth is divided into different number of areas with respective area sizes, each area corresponding to a pre-defined candidate position of one type of data.

Optionally, the available system bandwidth is divided into the plurality of pre-defined candidate positions in accordance with a DVRB or a Localized Virtual Resource Block (LVRB).

Optionally, the step that the frequency domain position for data transmission is determined based on the pre-defined candidate positions includes that:

the frequency domain position for data transmission is determined among the pre-defined candidate positions according to at least one of a cell ID, a UE ID, a subframe index, a radio frame index, a scheduling window index, types of information, types of Radio Network Temporary Identifiers (RNTIs) and a signalling.

Optionally, a method for specifically determining the pre-defined candidate positions includes that: a pre-defined frequency domain position is determined among the pre-defined candidate positions in accordance with a determined rule according to at least one of a cell ID, a UE ID, a subframe index, a radio frame index, a scheduling window index and types of RNTIs. For instance, there are n candidate positions, and the pre-defined frequency domain position is determined according to (cell ID+radio frame index+RNTI) mod n.

Or, randomly determining a candidate position mainly refers to taking information such as a cell ID as an initial input value using a random function to obtain a random value so as to determine the candidate position, the candidate position corresponding to the information such as the cell ID being random.

Optionally, the pre-defined frequency domain position is determined among the pre-defined candidate positions in accordance with different modes for different types of information. That is, the step that the frequency domain position for data transmission is determined among the pre-defined candidate positions according to the types of information includes at least one of:

for a System Information Block 1 (SIB1), the frequency domain position for data transmission is determined among the pre-defined candidate positions according to a cell ID and/or a radio frame index;

for other SIBs, the frequency domain position for data transmission is determined among the pre-defined candidate positions according to at least one of a cell ID, a radio frame index, a subframe index and a scheduling window index;

for a Random Access Response (RAR) message, the frequency domain position for data transmission is determined among the pre-defined candidate positions according to at least one of a cell ID, a radio frame index, a subframe index and an RNTI, the RNTI being a random access RNTI;

for a Paging message, the frequency domain position for data transmission is determined among the pre-defined candidate positions according to at least one of a cell ID, a radio frame index, a subframe index and an RNTI, the RNTI being a Paging RNTI or a Paging UE-identity; and the frequency domain position for data transmission is determined among the pre-defined candidate positions according to at least one of a cell ID, a radio frame index, a subframe index and an RNTI for UE specific data, the RNTI being a cell RNTI (C-RNTI).

Optionally, the method further includes that: the frequency domain position for data transmission among the pre-defined candidate positions is indicated by means of a signalling, which specifically includes that:

for the SIB1, the pre-defined frequency domain position is indicated by means of a Main system Information Block (MIB);

for other SIBs, the pre-defined frequency domain position is indicated by means of the MIB or the SIB1;

the pre-defined frequency domain position is indicated by means of the MIB or the SIB1 or an SIB2 for RAR; and the pre-defined frequency domain position is indicated by means of the MIB or the SIB1 and the SIB2 or the other SIBs for Paging.

Optionally, the step that the frequency domain position for data transmission is determined includes that:

when various types of information need to be transmitted in a subframe and the sum of frequency domain position bandwidths corresponding to different types of information is greater than a maximum reception bandwidth supported by a terminal, a frequency domain position for information transmission on the subframe is determined in accordance with a pre-set priority. By adopting the solutions of the embodiment, the collision problems caused by different candidate positions of different types of information can be solved.

Optionally, the pre-set priority includes one of:

the priority of UE specific data being higher than that of common information;

the priority of UE specific data being higher than that of common information under a pre-set first scenario, and the priority of common information being higher than that of UE specific data under a pre-set second scenario; and the priority of common information being higher than that of UE specific data.

Optionally, the priority of common information includes one of:

SIB1>other SIBs>RAR>Paging; or

Paging>SIB1>other SIBs>RAR, or

Paging>RAR>other SIBs>SIB1.

Figure 2:
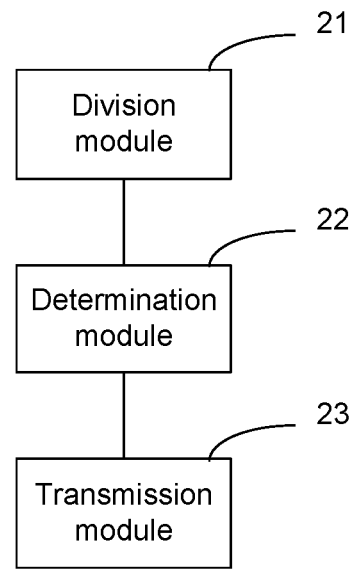
FIG. 2 is a structural diagram of a data transmission apparatus according to an embodiment of the disclosure.

The embodiments of the disclosure also provide a data transmission apparatus accordingly. As shown in FIG. 2, the apparatus includes: a division module 21, a determination module 22 and a transmission module 23, wherein the division module 21 is configured to divide an available system bandwidth into a plurality of pre-defined candidate positions;

the determination module 22 is configured to determine a frequency domain position for data transmission based on the pre-defined candidate positions; and the transmission module 23 is configured to transmit data at the determined frequency domain position.

Optionally, the division module 21 is specifically configured to divide the available system bandwidth into the plurality of pre-defined candidate positions in accordance with a reception bandwidth of a terminal.

Optionally, the division module 21 is specifically configured to:

divide the available system bandwidth into the plurality of pre-defined candidate positions in accordance with an equal division mode, a frequency domain bandwidth of each pre-defined candidate position being equal to a maximum reception bandwidth of the terminal; or divide the available system bandwidth into the plurality of pre-defined candidate positions in accordance with a fixed division position, a frequency domain bandwidth of each pre-defined candidate position being smaller than or equal to a maximum reception bandwidth of the terminal.

Optionally, the division module 21 is specifically configured to:

for different types of data, divide the available system bandwidth into different number of areas with respective area sizes, each area corresponding to a pre-defined candidate position of one type of data.

Optionally, the division module 21 is specifically configured to:

divide the available system bandwidth into the plurality of pre-defined candidate positions in accordance with a DVRB or an LVRB.

Optionally, the determination module 22 is specifically configured to:

determine the frequency domain position for data transmission among the pre-defined candidate positions according to at least one of a cell ID, a UE ID, a subframe index, a radio frame index, a scheduling window index, types of information, types of RNTIs and a signalling.

Optionally, the determination module 22 is specifically configured to execute at least one of the following operations:

for the SIB1, determining the frequency domain position for data transmission among the pre-defined candidate positions according to a cell ID and/or a radio frame index;

for other SIBs, determining the frequency domain position for data transmission among the pre-defined candidate positions according to at least one of a cell ID, a radio frame index, a subframe index and a scheduling window index;

for the RAR message, determining the frequency domain position for data transmission among the pre-defined candidate positions according to at least one of a cell ID, a radio frame index, a subframe index and an RNTI, the RNTI being a random access RNTI;

for the Paging message, determining the frequency domain position for data transmission among the pre-defined candidate positions according to at least one of a cell ID, a radio frame index, a subframe index and an RNTI, the RNTI being a Paging RNTI or a Paging UE-identity; and determining the frequency domain position for data transmission among the pre-defined candidate positions according to at least one of a cell ID, a radio frame index, a subframe index and an RNTI for UE specific data, the RNTI being a C-RNTI.

Figure 3:
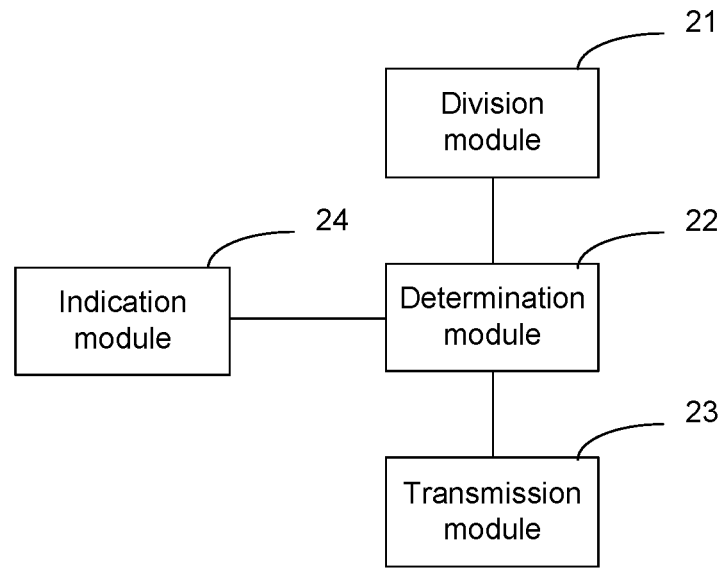
FIG. 3 is a structural diagram of a data transmission apparatus according to an embodiment of the disclosure.

Optionally, as shown in FIG. 3, the apparatus further includes an indication module 24, configured to indicate the frequency domain position for data transmission among the pre-defined candidate positions by means of a signalling, specifically configured to: for the SIB1, indicate the pre-defined frequency domain position by means of an MIB; for other SIBs, indicate the pre-defined frequency domain position by means of the MIB or the SIB1; for the RAR message, indicate the pre-defined frequency domain position by means of the MIB or the SIB1 or an SIB2; and for the paging message, indicate the pre-defined frequency domain position by means of the MIB or the SIB1 and the SIB2 or the other SIBs.

Figure 4:
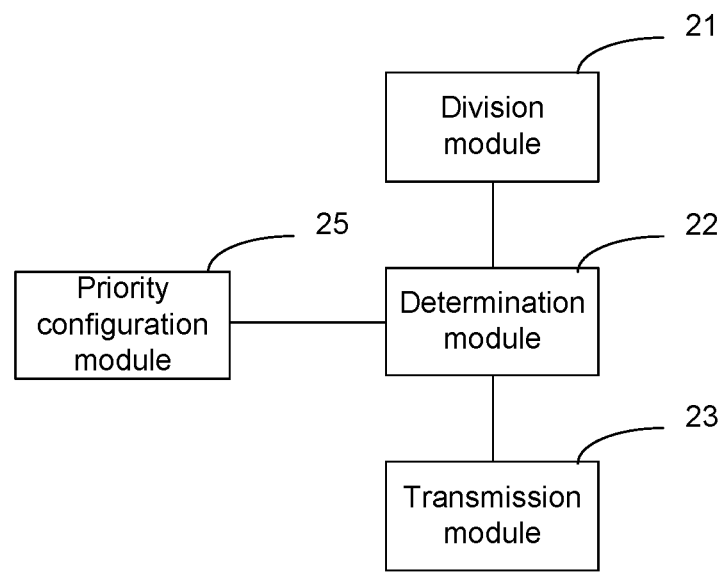
FIG. 4 is a structural diagram of a data transmission apparatus according to an embodiment of the disclosure.

Optionally, as shown in FIG. 4, the apparatus further includes a priority configuration module 25.

The determination module 22 is specifically configured to determine, when various types of information need to be transmitted in a subframe and the sum of frequency domain position bandwidths corresponding to different types of information is greater than a maximum reception bandwidth supported by a terminal, a frequency domain position for information transmission on the subframe in accordance with a pre-set priority.

The priority configuration module 25 is configured to store the pre-set priority.

Optionally, the pre-set priority stored by the priority configuration module 25 includes one of: the priority of UE specific data being higher than that of common information; the priority of UE specific data being higher than that of common information under a pre-set first scenario, and the priority of common information being higher than that of UE specific data under a pre-set second scenario; and the priority of common information being higher than that of UE specific data.

By using the solutions proposed in the embodiments of the disclosure, it can be ensured that a low-cost bandwidth-limited MTC terminal correctly and effectively receives data, thereby avoiding collisions and interferences of sending of data of low-cost terminals in different cells over a fixed pre-defined bandwidth, and effectively avoiding the overhead problem that a PDCCH indicates data sending of the bandwidth-limited MTC terminal.

The technical solutions of the disclosure are further illustrated below by means of the specific embodiments in detail.

Embodiment 1

The embodiment describes and illustrates a data transmission method under a Frequency Division Duplexing (FDD) system and a Time Division Duplexing (TDD) system in detail.

Figure 5:
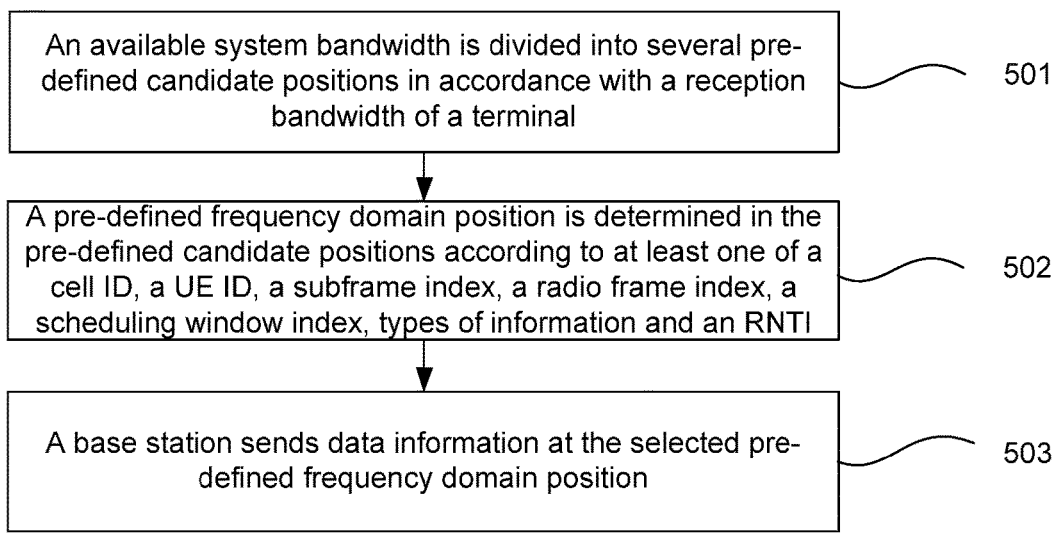
FIG. 5 is a specific processing flowchart of a base station side according to an embodiment 1 of the disclosure.

In the embodiment, as shown in FIG. 5, specific processing at a base station side includes the steps as follows.

Step 501: An available system bandwidth is divided into several pre-defined candidate positions in accordance with a reception bandwidth of the terminal.

Here, the available system bandwidth is divided into the plurality of pre-defined candidate positions by means of an equal division mode, a frequency domain bandwidth of each pre-defined candidate position being equal to a maximum reception bandwidth of the terminal. For instance, if the reception bandwidth of the terminal is 3 MHz, a system bandwidth of 20 MHz is divided into six positions by taking every 15 DVRBs as one pre-defined candidate position. Or, the available system bandwidth is divided into the plurality of pre-defined candidate positions in accordance with a fixed division position, a frequency domain bandwidth of each pre-defined candidate position being smaller than or equal to the reception bandwidth of the terminal. Different candidate areas may be equal in size or may be not equal in size. For instance, 20 MHz and 15 MHz are divided into six areas, 10 MHz is divided into three areas, and 5 MHz is divided into two areas, each area corresponding to a pre-defined candidate position. In the situation where different candidate areas are equal in size, specifically, each area is a start Virtual Resource Block (VRB)+ N successive VRBs, wherein the start VRB of the $k^{th}$ area is equal to floor(number of available VRBs/n)*k, where k=0, 1, 2, . . . , n−1; N is a maximum reception bandwidth of the terminal or the number of RBs contained from a start position of a current area to a start position of a subsequent adjacent area; and n is the number of pre-defined candidate positions, n may be a pre-defined value, or n is determined according to a system bandwidth.

Step 502: A pre-defined frequency domain position is determined among the pre-defined candidate positions according to at least one of a cell ID, a UE ID, a subframe index, a radio frame index, a scheduling window index, types of information and types of RNTIs.

The pre-defined frequency domain position is determined among the pre-defined candidate positions in accordance with different modes for different types of information. For an SIB1, the pre-defined frequency domain position is determined among the pre-defined candidate positions according to a cell ID and/or a radio frame index; for other SIBs, the pre-defined frequency domain position is determined among the pre-defined candidate positions according to at least one of a cell ID, a radio frame index, a subframe index and a scheduling window index; for an RAR message, the pre-defined frequency domain position is determined among the pre-defined candidate positions according to at least one of a cell ID, a radio frame index, a subframe index and an RNTI, the RNTI being a random access RNTI; for a Paging message, the pre-defined frequency domain position is determined among the pre-defined candidate positions according to at least one of a cell ID, a radio frame index, a subframe index and an RNTI, the RNTI being a Paging RNTI or a Paging UE-identity; and the pre-defined frequency domain position is determined among the pre-defined candidate positions according to at least one of a cell ID, a radio frame index, a subframe index and an RNTI for UE specific data, the RNTI being a C-RNTI. The available system bandwidth can be divided into the plurality of pre-defined candidate positions in accordance with a DVRB or can be divided in accordance with an LVRB.

A method for specifically determining the pre-defined candidate positions includes that: the pre-defined frequency domain position is determined among the pre-defined candidate positions in accordance with a determined rule according to at least one of a cell ID, a UE ID, a subframe index, a radio frame index, a scheduling window index and an RNTI. For instance, there are n candidate positions, and the pre-defined frequency domain position is determined according to (cell ID+radio frame index+RNTI) mod n or according to (cell ID) mod n or according to radio frame index mod n or according to (cell ID+radio frame index) mod n. Or, randomly determining a candidate position mainly refers to taking information such as a cell ID as an initial input value using a random function to obtain a random value so as to determine the candidate position, the candidate position corresponding to the information such as the cell ID being random.

Step 503: A base station sends data information at the selected pre-defined frequency domain position.

When various types of data information need to be transmitted in a subframe and the sum of frequency domain position bandwidths corresponding to different types of data information is greater than a maximum reception bandwidth supported by a terminal, a frequency domain position for information transmission on the subframe is determined in accordance with a pre-set priority, and information is transmitted at the frequency domain position. The priority between UE specific data and common information includes one of:

Mode 1: the priority of the UE specific data is higher than that of the common information;

Mode 2: the priority of the UE specific data is higher than that of the common information under some scenarios, and the priority of the common information is higher than that of the UE specific data under some scenarios; and Mode 3: the priority of the common information is higher than that of the UE specific data.

The priority of the common information includes one of: SIB1>other SIBs>RAR>Paging; or Paging>SIB1>other SIBs>RAR, or Paging>RAR>other SIBs>SIB1.

If the number of VRBs where high-priority data (information) is located is smaller than a maximum reception bandwidth of a UE, a candidate position for terminal reception is determined according to positions corresponding to the VRBs where the high-priority data (information) is located.

Specifically, a candidate position containing most VRBs where the high-priority data (information) is located in n pre-defined candidate positions is taken as the candidate position for terminal reception.

Figure 6:
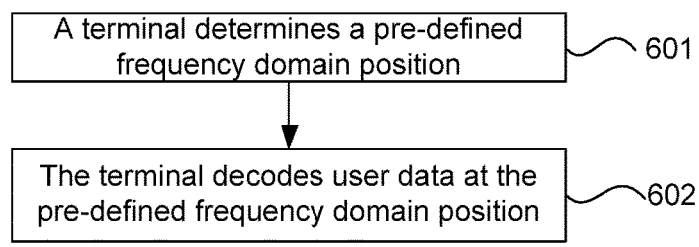
FIG. 6 is a specific processing flowchart of a terminal side according to an embodiment 1 of the disclosure.

In the embodiment, as shown in FIG. 6, processing at a terminal side includes the steps as follows.

Step 601: A terminal determines a pre-defined frequency domain position.

The terminal acquires pre-defined candidate positions according to an available system bandwidth and a reception bandwidth of the terminal. The pre-defined frequency domain position is determined among the pre-defined candidate positions according to at least one of a cell ID, a UE ID, a subframe index, a radio frame index, a scheduling window index, types of information and types of RNTIs. A specific mode of determining the pre-defined frequency domain position in the pre-defined candidate positions for different types of information includes: for an SIB1, determining the pre-defined frequency domain position in the pre-defined candidate positions according to a cell ID and/or a radio frame index; for other SIBs, determining the pre-defined frequency domain position in the pre-defined candidate positions according to at least one of a cell ID, a radio frame index, a subframe index and a scheduling window index; for an RAR message, determining the pre-defined frequency domain position in the pre-defined candidate positions according to at least one of a cell ID, a radio frame index, a subframe index and an RNTI, the RNTI being a random access RNTI; for a Paging message, determining the pre-defined frequency domain position in the pre-defined candidate positions according to at least one of a cell ID, a radio frame index, a subframe index and an RNTI, the RNTI being a Paging RNTI or a Paging UE-identity; and determining the pre-defined frequency domain position in the pre-defined candidate positions according to at least one of a cell ID, a radio frame index, a subframe index and an RNTI for UE specific data, the RNTI being a C-RNTI. The available system bandwidth can be divided into the plurality of pre-defined candidate positions in accordance with a DVRB or can be divided in accordance with an LVRB. A method for specifically determining the pre-defined candidate positions includes that: the pre-defined frequency domain position is determined among the pre-defined candidate positions in accordance with a determined rule according to at least one of a cell ID, a UE ID, a subframe index, a radio frame index, a scheduling window index and an RNTI. For instance, there are n candidate positions, and the pre-defined frequency domain position is determined according to (cell ID+radio frame index+RNTI) mod n or according to (cell ID) mod n or according to radio frame index mod n or according to (cell ID+radio frame index) mod n. Or, randomly determining a candidate position mainly refers to taking information such as a cell ID as an initial input value using a random function to obtain a random value so as to determine the candidate position, the candidate position corresponding to the information such as the cell ID being random.

Step 602: The terminal decodes user data at the pre-defined frequency domain position.

The embodiment can ensure that a low-cost bandwidth-limited MTC terminal correctly and effectively receives data, thereby avoiding collisions and interferences of sending of data of low-cost terminals in different cells over a fixed pre-defined bandwidth, and effectively avoiding the overhead problem that a PDCCH indicates data sending of the bandwidth-limited MTC terminal.

Embodiment 2

The embodiment describes and illustrates a data transmission method under an FDD system and a TDD system in detail.

Figure 7:
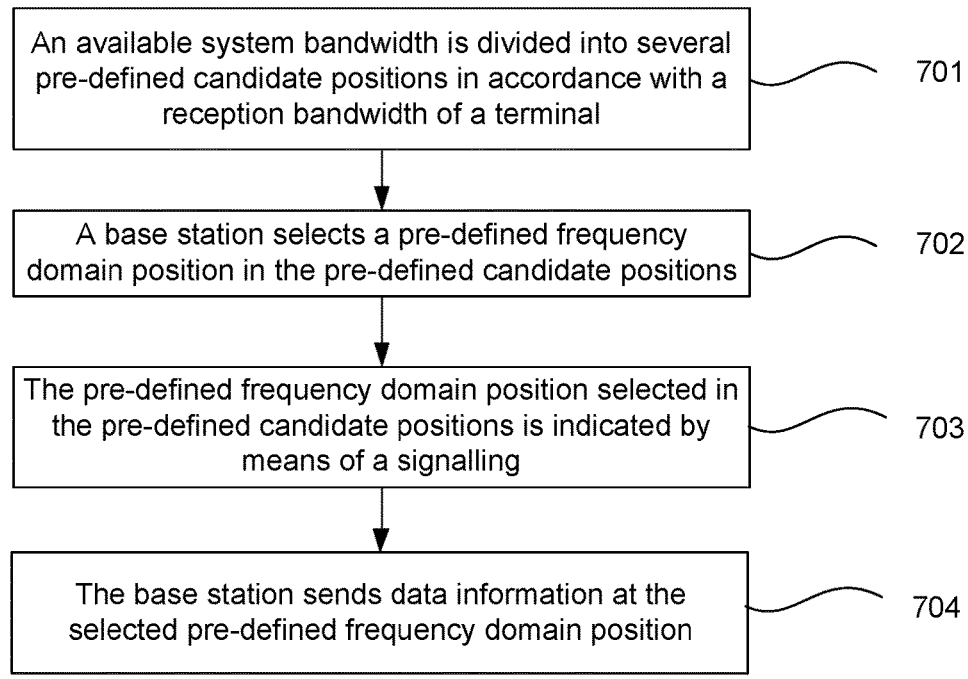
FIG. 7 is a specific processing flowchart of a base station side according to an embodiment 2 of the disclosure.

In the embodiment, as shown in FIG. 7, specific processing at a base station side includes the steps as follows.

Step 701: An available system bandwidth is divided into several pre-defined candidate positions in accordance with a reception bandwidth of a terminal. During the division of the available system bandwidth into the pre-defined candidate positions, for different types of data, the available system bandwidth is divided into different number of areas with respective area sizes, each area corresponding to a pre-defined candidate position of one type of data. That is, for UE specific data, the available system bandwidth is divided into M1 pre-defined candidate positions; for common message data, the available system bandwidth is divided into M2 pre-defined candidate positions; and M1 and M2 may be identical or different. Specifically, for a certain type of data, the available system bandwidth can be divided into pre-defined candidate positions by means of an equal division mode. The available system bandwidth is divided into the plurality of pre-defined candidate positions by means of the equal division mode, a frequency domain bandwidth of each pre-defined candidate position being equal to or smaller than a reception bandwidth of a terminal. For instance, if the reception bandwidth of the terminal is 3 MHz, for the common message data, a system bandwidth of 20 MHz is divided into six positions by taking every 15 DVRBs as one pre-defined candidate position; and for the UE specific data, the system bandwidth of 20 MHz is divided into 16 positions by taking every six DVRBs as one pre-defined candidate position.

Step 702: A base station determines a pre-defined frequency domain position in the pre-defined candidate positions, wherein the base station can determine a frequency domain position according to at least one of a cell ID and a UE ID.

Step 703: The pre-defined frequency domain position determined among the pre-defined candidate positions is indicated by means of a signalling; for an SIB1, the pre-defined frequency domain position is indicated by means of an MIB; for other SIBs, the pre-defined frequency domain position is indicated by means of the MIB or the SIB1; for an RAR message, the pre-defined frequency domain position is indicated by means of the MIB or the SIB1 or an SIB2; and for a Paging message, the pre-defined frequency domain position is indicated by means of the MIB or the SIB1 or the SIB2 or the other SIBs.

Step 704: The base station sends data information at the selected pre-defined frequency domain position. When various types of data information need to be transmitted in a subframe and the sum of frequency domain position bandwidths corresponding to different types of data information is greater than a maximum reception bandwidth supported by a terminal, a frequency domain position for information transmission on the subframe is determined in accordance with a pre-set priority, and information is transmitted at the frequency domain position. The priority between the UE specific data and common information includes one of:

Mode 1: the priority of the UE specific data is higher than that of the common information;

Mode 2: the priority of the UE specific data is higher than that of the common information under some scenarios, and the priority of the common information is higher than that of the UE specific data under some scenarios; and Mode 3: the priority of the common information is higher than that of the UE specific data.

The priority of the common information includes one of:
SIB1>other SIBs>RAR>Paging; or Paging>SIB1>other SIBs>RAR, or Paging>RAR>other SIBs>SIB1.

Figure 8:
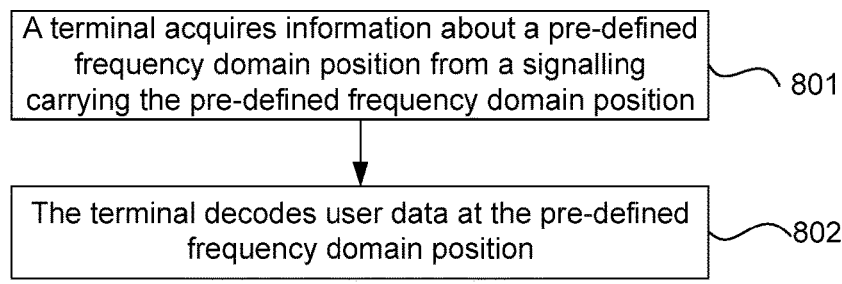
FIG. 8 is a specific processing flowchart of a terminal side according to an embodiment 2 of the disclosure.

In the embodiment, as shown in FIG. 8, processing at a terminal side includes the steps as follows.

Step 801: A terminal acquires information about a pre-defined frequency domain position from a signalling carrying the pre-defined frequency domain position.

Step 802: The terminal decodes user data at the pre-defined frequency domain position.

In the embodiment, for different types of data, the available system bandwidth can be divided into pre-defined candidate positions, thereby improving the flexibility of scheduling, ensuring that a low-cost bandwidth-limited MTC terminal correctly and effectively receives data, and avoiding collisions and interferences of sending of data by low-cost terminals in different cells over a fixed pre-defined bandwidth.

The above is only the preferred embodiments of the disclosure and is not intended to limit the protective scope of the disclosure.

INDUSTRIAL APPLICABILITY

By integrating the above embodiments of the disclosure, a frequency domain position for data transmission is determined based on pre-defined candidate positions, and data is transmitted at the frequency domain position. The problems that a low-coverage terminal user may wrongly receive data and the utilization rate of resources is lower can be solved, and normal communication demands of a terminal device are guaranteed.

What is claimed is:

1. A data transmission method, comprising:
  dividing, by a base station, an available system bandwidth into a plurality of pre-defined candidate positions;
  determining, by the base station, a frequency domain position for data transmission based on the pre-defined candidate positions; and
  transmitting, by the base station, data at the determined frequency domain position to a User Equipment (UE), so that the UE receives and decodes the data at a frequency domain position corresponding to the determined frequency domain position;
  wherein determining, by the base station, the frequency domain position for data transmission comprises:
    when different types of information need to be transmitted in a subframe and a sum of frequency domain position bandwidths corresponding to the different types of information is greater than a maximum reception bandwidth supported by the UE, determining, by the base station, a frequency domain position for information transmission on the subframe in accordance with a pre-set priority.

2. The method according to claim 1, wherein dividing, by the base station, the available system bandwidth into the plurality of pre-defined candidate positions comprises:
  dividing, by the base station, the available system bandwidth into the plurality of pre-defined candidate positions in accordance with a reception bandwidth of the UE.

3. The method according to claim 1, wherein dividing, by the base station, the available system bandwidth into the plurality of pre-defined candidate positions comprises:
  dividing, by the base station, the available system bandwidth into the plurality of pre-defined candidate positions in accordance with an equal division mode, a frequency domain bandwidth of each pre-defined candidate position being equal to the maximum reception bandwidth of the UE; or
  dividing, by the base station, the available system bandwidth into the plurality of pre-defined candidate positions in accordance with a fixed division position, a frequency domain bandwidth of each pre-defined candidate position being smaller than or equal to the maximum reception bandwidth of the UE.

4. The method according to claim 1, wherein dividing, by the base station, the available system bandwidth into the plurality of pre-defined candidate positions comprises:
  for different types of data, dividing, by the base station, the available system bandwidth into a different number of areas with respective area sizes, each area corresponding to a pre-defined candidate position of one type of data.

5. The method according to claim 1, wherein the available system bandwidth is divided, by the base station, into the plurality of pre-defined candidate positions in accordance with a Distributed Virtual Resource Blocks (DVRB) or a Localized Virtual Resource Block (LVRB) or a Physical Resource Block (PRB) or a Resource Block (RB).

6. The method according to claim 1, further comprising:
  indicating, by the base station, the frequency domain position for data transmission among the pre-defined candidate positions by means of a signalling, specifically comprising:
  for a System Information Block 1 (SIB1), indicating a pre-defined frequency domain position by means of a Main system Information Block (MIB);
  for other SIBs, indicating the pre-defined frequency domain position by means of the MIB or the SIB1;
  for a Random Access Response (RAR) message, indicating the pre-defined frequency domain position by means of the MIB or the SIB1 or a SIB2; and
  for a Paging message, indicating the pre-defined frequency domain position by means of the MIB or the SIB1 and the SIB2 or the other SIBs.

7. The method according to claim 1, wherein the pre-set priority comprises one of:
  a priority of UE specific data being higher than that of common information;
  a priority of UE specific data being higher than that of common information under a pre-set first scenario, and a priority of common information being higher than that of UE specific data under a pre-set second scenario; or
  a priority of common information being higher than that of UE specific data.

8. The method according to claim 1, wherein determining the frequency domain position for data transmission based on the pre-defined candidate positions comprises:
  determining the frequency domain position for data transmission among the pre-defined candidate positions according to at least one of a cell ID, a UE ID, a subframe index, a radio frame index, a scheduling window index, types of information, types of Radio Network Temporary Identifiers (RNTIs) or a signalling.

9. The method according to claim 8, wherein determining the frequency domain position for data transmission among the pre-defined candidate positions according to the types of information comprises at least one of:
  for a System Information Block 1 (SIB1), determining the frequency domain position for data transmission among the pre-defined candidate positions according to at least the cell ID or the radio frame index;
  for other SIBs, determining the frequency domain position for data transmission among the pre-defined candidate positions according to at least one of the cell ID, the radio frame index, the subframe index or the scheduling window index;
  for a Random Access Response (RAR) message, determining the frequency domain position for data transmission among the pre-defined candidate positions according to at least one of the cell ID, the radio frame index, the subframe index or an RNTI, the RNTI being a Random Access RNTI (RA-RNTI);
  for a Paging message, determining the frequency domain position for data transmission among the pre-defined candidate positions according to at least one of the cell ID, the radio frame index, the subframe index or an RNTI, the RNTI being a Paging RNTI or a Paging UE-identity; and
  for UE specific data, determining the frequency domain position for data transmission among the pre-defined candidate positions according to at least one of the cell ID, the radio frame index, the subframe index or an RNTI, the RNTI being a cell RNTI (C-RNTI).

10. A base station, wherein the base station comprises a processor and a memory storing instructions executable by the processor, the processor is configured to:
   divide an available system bandwidth into a plurality of pre-defined candidate positions;
   determine a frequency domain position for data transmission based on the pre-defined candidate positions by determining, when different types of information need to be transmitted in a subframe and a sum of frequency domain position bandwidths corresponding to the different types of information is greater than a maximum reception bandwidth supported by a User Equipment (UE), a frequency domain position for information transmission on the subframe in accordance with a pre-set priority; and
   transmit data at the determined frequency domain position to the UE, so that the UE receives and decodes the data at a frequency domain position corresponding to the determined frequency domain position.

11. The base station according to claim 10, wherein the processor is further configured to:
   divide the available system bandwidth into the plurality of pre-defined candidate positions in accordance with a reception bandwidth of the UE.

12. The base station according to claim 10, wherein the processor is further configured to:
   divide the available system bandwidth into the plurality of pre-defined candidate positions in accordance with an equal division mode, a frequency domain bandwidth of each pre-defined candidate position being equal to the maximum reception bandwidth of the UE; or
   divide the available system bandwidth into the plurality of pre-defined candidate positions in accordance with a fixed division position, a frequency domain bandwidth of each pre-defined candidate position being smaller than or equal to the maximum reception bandwidth of the UE.

13. The base station according to claim 10, wherein the processor is further configured to:
   for different types of data, divide the available system bandwidth into a different number of areas with respective area sizes, each area corresponding to a pre-defined candidate position of one type of data.

14. The base station according to claim 10, wherein the processor is further configured to:
   divide the available system bandwidth into the plurality of pre-defined candidate positions in accordance with a Distributed Virtual Resource Blocks (DVRB) or a Localized Virtual Resource Block (LVRB) or a Physical Resource Block (PRB) or a Resource Block (RB).

15. The base station according to claim 10, wherein the processor is further configured to:
   indicate the frequency domain position for data transmission among the pre-defined candidate positions by means of a signalling, specifically configured to: for a System Information Block 1 (SIB1), indicate a pre-defined frequency domain position by means of a Main system Information Block (MIB); for other SIBs, indicate the pre-defined frequency domain position by means of the MIB or the SIB1; for a Random Access Response (RAR) message, indicate the pre-defined frequency domain position by means of the MIB or the SIB1 or a SIB2; and for a Paging message, indicate the pre-defined frequency domain position by means of the MIB or the SIB1 and the SIB2 or the other SIBs.

16. The base station according to claim 10, wherein the pre-set priority comprises one of: a priority of UE specific data being higher than that of common information; a priority of UE specific data being higher than that of common information under a pre-set first scenario, and a priority of common information being higher than that of UE specific data under a pre-set second scenario; or a priority of common information being higher than that of UE specific data.

17. The base station according to claim 10, wherein the processor is further configured to:
   determine the frequency domain position for data transmission among the pre-defined candidate positions according to at least one of a cell ID, a UE ID, a subframe index, a radio frame index, a scheduling window index, types of information, types of Radio Network Temporary Identifiers (RNTIs) or a signalling.

18. The base station according to claim 17, wherein the processor is further configured to at least one of:
   for a System Information Block 1 (SIB1), determine the frequency domain position for data transmission among the pre-defined candidate positions according to at least the cell ID or the radio frame index;
   for other SIBs, determine the frequency domain position for data transmission among the pre-defined candidate positions according to at least one of the cell ID, the radio frame index, the subframe index or the scheduling window index;
   for a Random Access Response (RAR) message, determine the frequency domain position for data transmission among the pre-defined candidate positions according to at least one of the cell ID, the radio frame index, the subframe index or an RNTI, the RNTI being a random access RNTI (RA-RNTI);
   for a Paging message, determine the frequency domain position for data transmission among the pre-defined candidate positions according to at least one of the cell ID, the radio frame index, the subframe index or an RNTI, the RNTI being a Paging RNTI or a Paging UE-identity; and
   for UE specific data, determine the frequency domain position for data transmission among the pre-defined candidate positions according to at least one of the cell ID, the radio frame index, the subframe index or an RNTI, the RNTI being a cell RNTI (C-RNTI).

* * * * *